United States Patent
Stratton et al.

(10) Patent No.: US 9,795,074 B2
(45) Date of Patent: Oct. 24, 2017

(54) AUTOMATIC SWATH GENERATION DEVICE AND METHODS

(71) Applicant: CNH Industrial America LLC, New Holland, PA (US)

(72) Inventors: John Stratton, Denver, CO (US); Matthew K. Payne, Thornton, CO (US); Tyson J. Dollinger, Mazon, IL (US); Matthew Lindsey, Tekonsha, MI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/923,672

(22) Filed: Oct. 27, 2015

(65) Prior Publication Data
US 2017/0112044 A1 Apr. 27, 2017

(51) Int. Cl.
*A01B 69/04* (2006.01)
*G05D 1/02* (2006.01)
*A01B 79/00* (2006.01)

(52) U.S. Cl.
CPC .......... *A01B 69/008* (2013.01); *A01B 79/005* (2013.01); *G05D 1/0212* (2013.01); *G05D 2201/0201* (2013.01)

(58) Field of Classification Search
CPC .. A01B 69/008; A01B 79/005; G05D 1/0212; G05D 1/0278; G05D 2201/0201
See application file for complete search history.

(56) References Cited

U.S. PATENT DOCUMENTS

| | | | |
|---|---|---|---|
| 5,995,902 A | * | 11/1999 | Monson ............... G05D 1/0278 345/442 |
| 6,085,130 A | | 7/2000 | Brandt et al. |
| 6,255,793 B1 | | 7/2001 | Peless et al. |
| 6,336,051 B1 | | 1/2002 | Pangels et al. |
| 6,876,920 B1 | * | 4/2005 | Mailer ................... A01B 69/00 342/457 |

(Continued)

FOREIGN PATENT DOCUMENTS

WO 2014/105281 A1 7/2014

OTHER PUBLICATIONS

Raven, "AccuRowTM Calibration and Operation Manual", Copyright 2009, 2012, Raven Industries, Inc., P/N 016-0171-275 Rev B 3/12 E19272, 50 pages.*

(Continued)

*Primary Examiner* — Behrang Badii
*Assistant Examiner* — David Testardi
(74) *Attorney, Agent, or Firm* — Rickard K. DeMille; Rebecca L. Henkel

(57) ABSTRACT

A method for automatically generating swath paths and navigating a vehicle along the generated swath paths using a controller includes the steps of: marking a plurality of field boundary points; storing the field boundary points in a memory unit of the vehicle; generating a field boundary defining the plurality of field boundary points connected to one another; selecting an edge of the field boundary as a base swath path; generating a plurality of subsequent swath paths from the base swath path; measuring a set of parameters of the vehicle; and automatically selecting one of the subsequent swath paths for the vehicle to follow based on the set of parameters.

12 Claims, 5 Drawing Sheets

(56) References Cited

U.S. PATENT DOCUMENTS

| | | | |
|---|---|---|---|
| 7,689,356 | B2 | 3/2010 | Dix et al. |
| 7,715,979 | B2 | 5/2010 | Dix |
| 7,747,370 | B2 | 6/2010 | Dix |
| 7,860,628 | B2 | 12/2010 | Lange |
| 8,204,654 | B2 | 6/2012 | Sachs et al. |
| 8,234,033 | B2 | 7/2012 | Brubaker et al. |
| 8,296,052 | B2 | 10/2012 | Dix et al. |
| 2004/0186644 | A1* | 9/2004 | McClure ............ A01B 69/008 701/50 |
| 2005/0171684 | A1* | 8/2005 | Turner ................ A01B 69/008 701/468 |
| 2005/0197766 | A1* | 9/2005 | Flann ................. A01B 79/005 701/533 |
| 2005/0267661 | A1* | 12/2005 | Iwazaki ................ B62D 1/286 701/41 |
| 2006/0175541 | A1* | 8/2006 | Eglington ........... G05D 1/0221 250/221 |
| 2006/0178820 | A1* | 8/2006 | Eglington ........... A01B 69/008 701/533 |
| 2007/0021913 | A1* | 1/2007 | Heiniger ............. A01B 69/008 701/412 |
| 2007/0168116 | A1* | 7/2007 | Meyer zu Helligen ............... G01C 21/20 701/50 |
| 2008/0103694 | A1* | 5/2008 | Dix ..................... A01B 69/008 701/425 |
| 2008/0215203 | A1* | 9/2008 | Dix ..................... A01B 69/008 701/26 |
| 2009/0265053 | A1* | 10/2009 | Dix ..................... A01B 69/008 701/26 |
| 2011/0231057 | A1* | 9/2011 | Ashjaee .............. A01B 69/008 701/41 |
| 2014/0012469 | A1* | 1/2014 | Kunihiro ............. B60W 40/072 701/41 |
| 2014/0081568 | A1 | 3/2014 | Pieper et al. |
| 2015/0331423 | A1* | 11/2015 | Volger .................. G01C 21/00 701/25 |
| 2016/0021813 | A1* | 1/2016 | Matthews ............ A01B 79/005 701/26 |

OTHER PUBLICATIONS

Raven, "Viper Pro™ Installation and Operation Manual", Software Version 3.10, Copyright 2007, 2008, 2009, 2010, 2011, 2012, 2013, 2014, Raven Industries, Inc., P/N 016-0171-122 Rev I 1/14 E22655, 300 pages.*

Trimble, "Farm Works™ Mapping Software User Guide", Version 2015 or later, Revision A, Jan. 2015, 307 pages.*

Khan Academy, "Curvature" (article), 25 pages, retrieved on Apr. 7, 2017 from https://www.khanacademy.org/math/multivariable-calculus/multivariable-derivatives/differentiating-vector-valued-functions/a/curvature.*

Timo Oksanen, "Path Planning Algorithms for Agricultural Field Machines", Helsinki University of Technology, Automation Technology Laboratory, Series A: Research Reports No. 31, Espoo, Dec. 2007 (112 pages).

Sytze de Bruin et al., "Spatial Optimisation of Cropped Swaths and Field Margins Using GIS", Computers and Electronics in Agriculture 68, 2009, pp. 185-190 (6 pages).

* cited by examiner

AUTOMATIC SWATH GENERATION DEVICE AND METHODS

BACKGROUND OF THE INVENTION

1. Field of the Invention

The present invention relates to agricultural vehicles, and, more particularly, to guidance assisted agricultural vehicles.

2. Description of the Related Art

Agricultural vehicles and implements are commonly used to perform various agricultural functions, such as tilling, planting, spraying, and fertilizing. As modern farming methods have become more competitive, it has become increasingly important that fields and agricultural products to be applied to the fields are used efficiently. To this end, agricultural functions applied to the fields, whether such agricultural function is tillage, seeding, or application of fertilizer or other chemicals, are carefully controlled in order to prevent gaps where the agricultural function is not applied, or overlaps where the agricultural function is applied more than once.

Agricultural vehicles commonly utilize control systems connected to position sensing technology, such as global positioning systems (GPS), to provide automatic guidance control in performing these various agricultural functions. The automatic guidance control systems are capable of steering the vehicle with a high degree of accuracy. The automatic guidance control systems often operate by creating at least one original base guidance line, called an "AB line," and then generating an array of adjacent guidance lines to be followed by the agricultural vehicle in performing its function. These adjacent guidance lines, or swaths, depend not only on the geometry of the original AB guidance line, but also upon the physical characteristics and limitations of the agricultural vehicle and/or any towed agricultural implements. Such physical characteristics and limitations may include width, location of the implement with respect to the vehicle, and limitations of movement, such as minimum turning radius.

To produce the guidance lines, a user normally needs to drive the vehicle around a field and mark points as the vehicle is travelling to set the boundaries of the field. This not only requires resources such as time and fuel, but can require constant updating if the field boundaries change. Some automatic guidance control systems are capable of creating guidance lines based on points defining the field boundaries, but such systems produce swath patterns that leave gaps in the corners of the field. Further, users have to manually drive the vehicle in the corners to get the implement pulled by the vehicle exactly lined up in the corner of the field, which is an inconvenience. Even further, current systems require that the user selects which guidance line the automatic guidance control system follows, which might result in the user selecting a less than optimal guidance line for the vehicle's location in the field.

What is needed in the art is an automatic guidance control system that overcomes some of the disadvantages of known systems.

SUMMARY OF THE INVENTION

The present invention provides a device and method for generating swath paths from field boundary points and automatically selecting a swath path for the vehicle to follow based on a set of parameters of the vehicle.

The invention in one form is directed to a method for automatically generating swath paths and navigating a vehicle along the generated swath paths using a controller, the method including the steps of: marking a plurality of field boundary points; storing the field boundary points in a memory unit of the vehicle; generating a field boundary defining the plurality of field boundary points connected to one another; selecting an edge of the field boundary as a base swath path; generating a plurality of subsequent swath paths from the base swath path; measuring a set of parameters of the vehicle; and automatically selecting one of the subsequent swath paths for the vehicle to follow based on the set of parameters.

The invention in another form is directed to an agricultural vehicle including: a chassis; at least one traction member carried by the chassis; an automatic guidance control system carried by the chassis and operable to control a direction of the at least one traction member; a memory unit having a plurality of field boundary points programmed therein; and a controller linked to the automatic guidance control system and the memory unit. The controller is operable to: generate a field boundary defining the plurality of field boundary points connected to one another; select an edge of the field boundary as a base swath path; generate a plurality of subsequent swath paths from the base swath path; measure a set of parameters of the vehicle; automatically select one of the subsequent swath paths based on the set of parameters; and cause the automatic guidance control system to direct the at least one traction member such that the vehicle follows the selected subsequent swath path.

An advantage of the present invention is the user can drive the vehicle normally through a field before allowing the controller to automatically select a swath path to follow.

Another advantage is the vehicle can automatically produce headland and infill areas without the user being required to mark a base swath path while driving the vehicle.

Yet another advantage is the vehicle can be controlled to follow swath paths that are perpendicular to one another adjacent to corners of the field, which can better cover the corner than rounded patterns.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
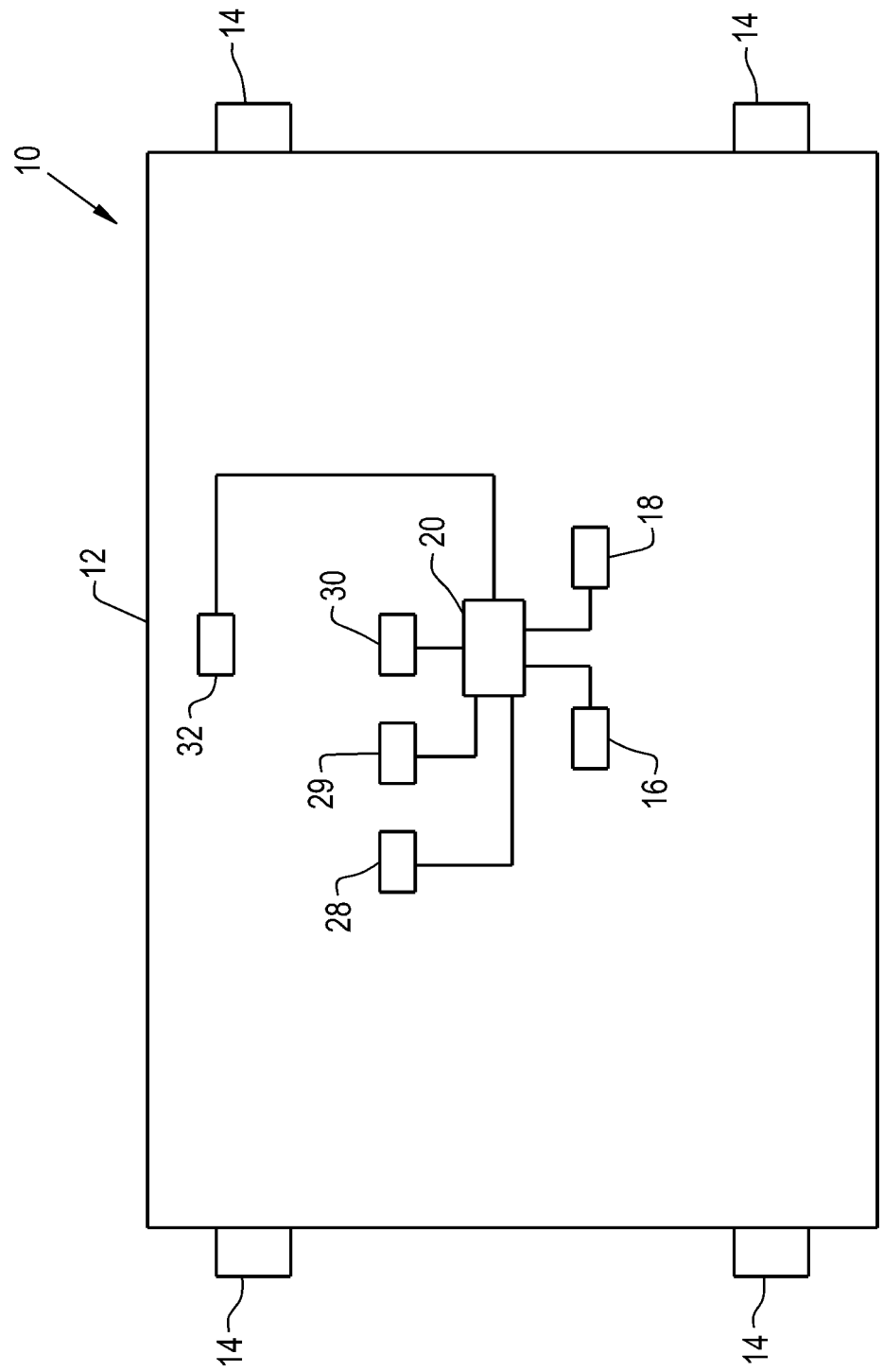
FIG. 1 is a block diagram of an embodiment of an agricultural vehicle according to the present invention.

Referring now to the drawings, and more particularly to FIG. 1, there is shown a block diagram of an embodiment of an agricultural vehicle 10 according to the present invention which generally includes a chassis 12, traction members 14, such as wheels, carried by the chassis 12, an automatic guidance control system 16 carried by the chassis 12, a memory unit 18 carried by the chassis 12, and a controller 20 coupled to the automatic guidance control system 16 and the memory unit 18. The vehicle 10, shown as a tractor in FIG. 3, can also include an agricultural implement that is pulled by the chassis 12 as the tractor 10 travels. The automatic guidance control system 16 can be any sort of suitable guidance system that can change a direction of the wheels 14 to control the travel direction of the vehicle 10 without the need for the user to directly control the wheels 14 with, for example, a steering wheel. Such guidance systems are known in the art and further description is omitted for the sake of brevity. The memory unit 18 can be any type of memory unit capable of storing data and/or instructions, such as a solid state memory module, a hard drive, etc. The memory unit 18 has multiple field boundary points 24, shown in FIG. 2, programmed therein that correspond to GPS or other geographic location points of a boundary of a field 26, also shown in FIG. 2. The boundary points 24 can be programmed into the memory unit 18 in any suitable way and can be produced by driving a vehicle equipped with a location sensor, such as a GPS sensor, across the field 26 and marking the boundary points 24 at desired locations in the field 26 or produced with farm management software without driving a vehicle across the field 26.

The controller 20 can also be coupled to other components of the vehicle 10, such as a speedometer 28, a location sensor 29, and a compass 30 that will allow the controller 20 to determine the speed and heading of the vehicle 10 as it travels across the field 26 and a display 32 to provide information processed by the controller 20 to the user. The speedometer 28, location sensor 29, and compass 30 can be any sort of suitable configuration for their respective purposes of measuring vehicle speed, location, and heading, respectively. The display 32 can be directly interactive, i.e., a touchscreen, or be connected to peripheral devices such as a control stick to allow the user to interact with the controller 20 and control various functions of the vehicle 10. A wide variety of such systems are known in the art and any suitable configuration can be used according to the present invention.

Figure 2:
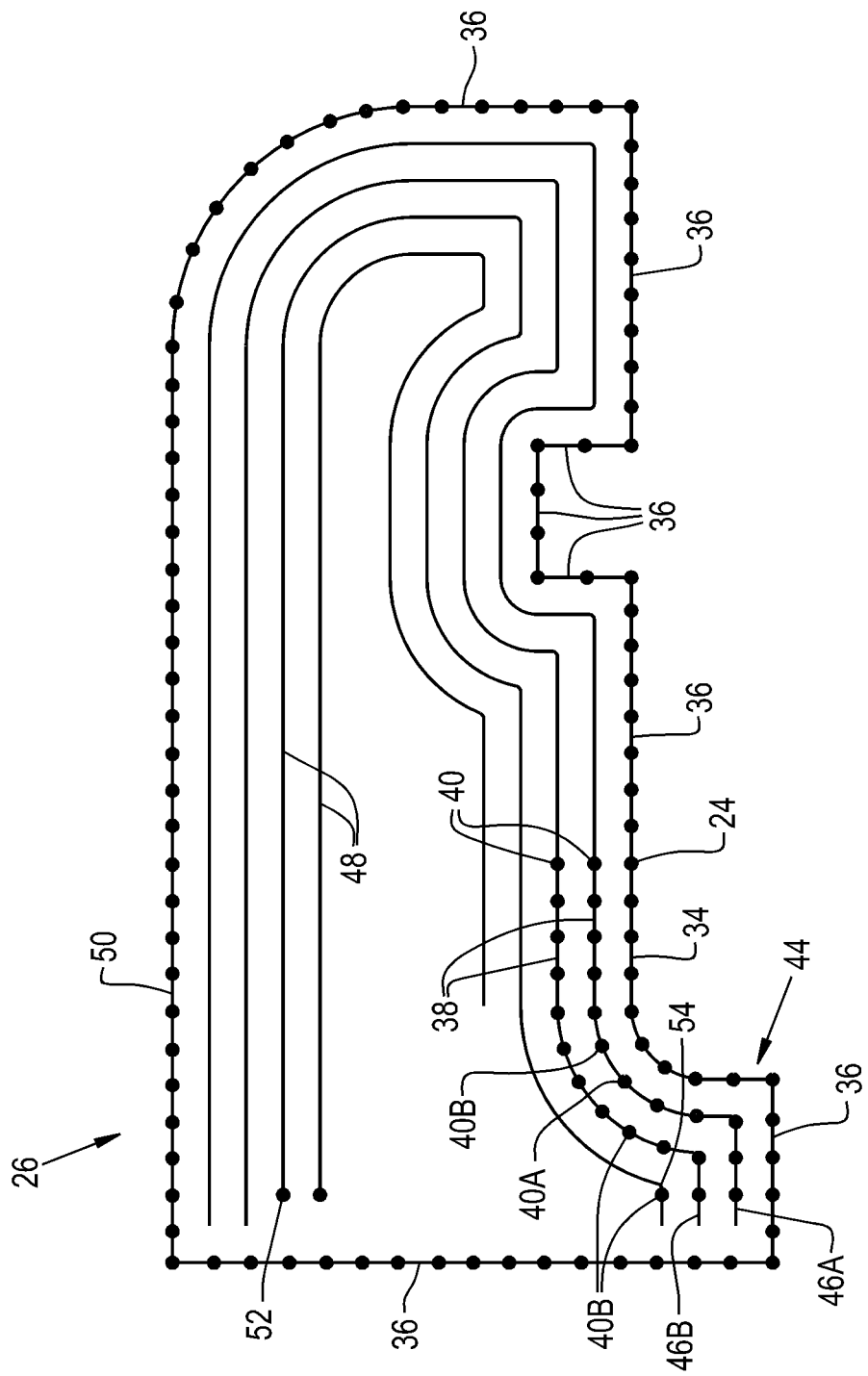
FIG. 2 is; a top view of an embodiment of a field with a swath pattern generated from field boundary lines according to the present invention.

Referring now to FIG. 2, a view of a field 26 that a user wishes to drive the vehicle 10 across is shown. This view of the field 26 can be projected from the controller 20 onto the display 32 so that the user can keep track of the vehicle's 10 relative position in the field 26. As can be seen, the field boundary points 24 stored in the memory unit 18 are marked on the field 26 as dots and define the outer boundary of the field 26. The controller 20 plots the field boundary points 24 and connects adjacent field boundary points 24 together to produce a boundary 34 of the field 26 with multiple edges 36. To produce the boundary 34, the controller 20 is programmed to connect various boundary points 24 together based on logic that is programmed into the controller 20. For example, the controller 20 can be programmed to always connect one boundary point 24 to its two closest adjacent boundary points 24 to produce a segment of the boundary 34. This can be done for each boundary point 24 to produce a series of segments that are connected to define the boundary 34. The segments can be produced as straight segments or curved segments, as will be described further herein.

Once the boundary 34 is produced, the controller 20 can recall or prompt the user for characteristics of the swath paths that the controller 20 will populate within the boundary 34. Such characteristics can include the number and width of headlands passes, shown as solid lines 38, desired adjacent to the boundary 34 and whether other swath paths generated within the boundary 34 should have a straight or curved shape. These characteristics can also be stored in the memory unit 18 and later recalled by the controller 20 for once again guiding the vehicle 10 or a different vehicle across the field 26. The controller 20 can produce the headlands passes 38 parallel to the boundary 34 so that the headland passes 38 define headland points 40 that are perpendicularly located a number of swath widths, such as one or two swath widths as shown in FIG. 2, away from the boundary 34. Only some of these headland points 40 are illustrated in FIG. 2 for ease of illustration and to avoid cluttering the figure. After the headland points 40 are generated, the controller 20 can construct the headland passes 38 by first choosing an evaluated headland point, designated as 40A in FIG. 2, and the two closest adjacent headland points to the evaluated headland point, designated as points 40B in FIG. 2. Once the two closest adjacent headland points 40B to the evaluated headland point 40A are identified, the controller 20 can evaluate whether the three boundary points 40A and 40B define a line with a predefined variance, such as a percentage of a swath width on either side of the line. If the three headland points do define such a line, a straight line swath path can be generated as the segment of the headland pass 38. If the three boundary points do not define such a line, a curved swath path can be generated as the segment of the headland pass 38, assuming that the curved swath path has a curvature that is less than that of a minimum turning radius of the vehicle 10 and pulled implement. If the curved swath path has a curvature that is greater than that of a minimum turning radius of the vehicle 10 and pulled implement, which can be pre-loaded into the memory unit 18 or controller 20, the controller 20 can divide the produced curved segment into two or more sub-segments that each have a curvature less than that of the minimum maximum turning radius of the vehicle 10 and pulled implement.

Alternatively, if the curved swath path has a curvature that is greater than that of the minimum turning radius of the vehicle 10 and pulled implement, the controller 20 can evaluate whether the segment is part of a field corner, such as field corner 44 shown in FIG. 2, by constructing a subsequent segment on both sides of the segment to determine if the originally produced segment and either subsequent segment produces an angle relative to one another greater than a corner threshold angle, such as 60°. Put another way, the controller 20 can evaluate whether the travel path of the vehicle 10 in the evaluated area will change the current heading of the vehicle 10 to be greater than the corner threshold angle, in which case the controller 20 can define the area as a field corner. If the segments produce an angle greater than the corner threshold angle, which can be seen at field corner 44, the controller 20 can determine that at least one pair of headland passes adjacent to the field corner 44, labelled as 46A and 46B, should be constructed as perpendicular passes adjacent to one another. The number of pairs of perpendicular passes 46A and 46B can correspond to a chosen number of swath widths or the controller 20 can construct perpendicular passes adjacent to the field corner 44 until relative angles formed between two subsequent segments of a headland pass no longer exceed the corner threshold angle. This allows the vehicle 10 to travel the field corner 44 and line up the vehicle 10 and pulled implement adjacent to the field corner 44 using the controller 20 and automatic guidance control system 16 without the user needing to take manual control of the vehicle 10. Further, the produced perpendicular passes 46A and 46B ensure better coverage of the field corner 44 by the pulled implement than current systems which cut off portions of such field corners to produce a rounded path that the vehicle covers.

After the headland passes 38 are constructed, additional swath paths 48, which can be called infill paths, are generated inside the boundary 36 interior of the headland passes 38. Each infill path 48 can be generated similarly to the headland passes 38 so that the infill paths 48 are parallel to the headland passes 38 so the vehicle 10 can be guided across the majority of the field 26 carrying the implement. The infill paths 48 can be generated as a sequence of paths that are based off a baseline edge 50 of the boundary 36, such as the longest edge of the boundary 36, so that the infill paths 48 extend parallel to the baseline edge 50 at the beginning and then follow the boundary 36 toward an end point. In this sense, each infill path 48 can define a start point, such as start point 52, and an end point, such as end point 54. The start point 52 and end point 54 can define where the vehicle 10 begins its travel on the infill path 48 and where the vehicle ends its travel on the infill path 48, respectively, before the user should select another swath path to follow.

Figure 3:
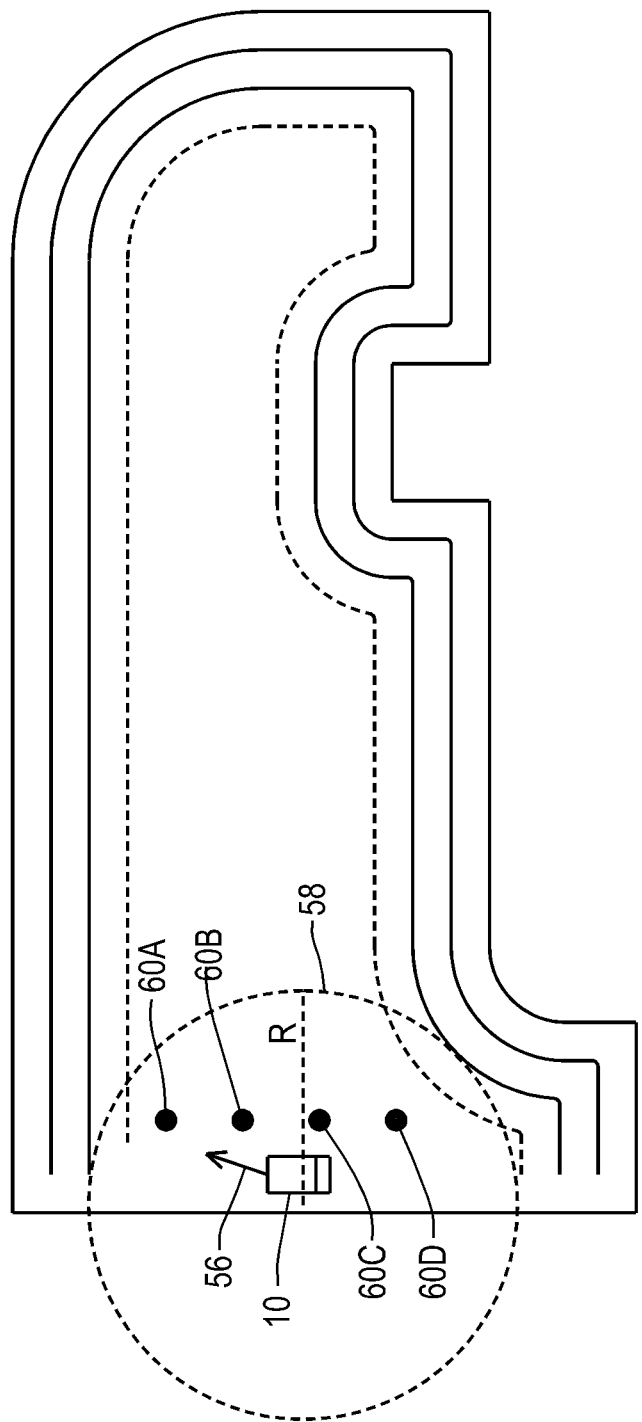
FIG. 3 is a top view of the agricultural vehicle shown in FIG. 1 traversing the field shown in FIG. 2.

To simplify the task of selecting the appropriate infill path to follow, and referring now to FIG. 3, the controller 20 is programmed with swath path selecting logic to automatically select a swath path for the vehicle 10 to follow without requiring the user to manually select the desired swath path. The controller 20 selects the desired swath path using predictive logic based on a set of parameters that indicate the user's desired swath path to follow. Such parameters can include a current geographic location of the vehicle 10, illustrated as a square in FIG. 3, a current heading of the vehicle 10, designated as arrow 56, and a current speed of the vehicle 10, which can be an input to the controller 20 from, for example, a speedometer. The user can drive the vehicle 10 manually across the field 26 as they normally would before prompting the auto-guidance to start.

Once the auto-guidance is engaged, the controller 20 can query the speedometer 28, location sensor 29, and compass 30 for the vehicle's speed, current geographic location, and heading to determine which swath path the user intends to follow. The controller 20 can, for example, first determine the current geographic location of the vehicle 10 within the field 26 and generate a detection circle 58 around the vehicle 10 with a radius R equivalent to a predetermined number of swath widths, such as four swath widths. Once the detection circle 58 is generated, the controller 20 can determine which start points, if any, are located within the detection circle 58. As can be seen in FIG. 3, there are four swath path start points, designated as 60A, 60B, 60C, and 60D, within the detection circle 58 that the user most likely desired to choose. After establishing the number of swath start points in the detection circle 58, the controller 20 can then evaluate the current heading 56 of the vehicle 10 and predict which of the swath path start points 60A, 60B, 60C, and 60D are likely desired to be selected based on the angle change from the current heading 56 that is required to navigate the vehicle 10 to a specific swath path start point 60A, 60B, 60C, 60D. As can be seen, swath path start points 60A and 60B are within 90 degrees on either side of the current heading 56, signifying that the vehicle 10 does not need to be turned around in the opposite direction to begin on either swath path start point 60A or 60B. Swath path start points 60C and 60D, however, require a turn of more than 90 degrees on either side of the current heading 56, signifying that the vehicle 10 was travelling in the opposite direction of these swath path start points 60C, 60D and the user therefore did not desire to select these swath path start points 60C, 60D. After narrowing down the likely desired swath path start points to 60A and 60B, the controller 20 can evaluate the current speed and speed history to make a decision which swath path start point 60A or 60B the user intends for the vehicle 10 to follow. For example, the controller 20 can keep track of measured speeds from the speedometer 28 to determine that the vehicle 10 was recently accelerating. Thus, even though swath path start point 60B is in closer proximity to the vehicle 10 than swath path start point 60A, the acceleration of the vehicle 10 indicates that the user does not intend to start on swath path start point 60B and rather intends to start on swath path start point 60A. If the reverse were true and the vehicle 10 was recently decelerating, this would indicate that the user is slowing down the vehicle 10 to turn onto swath path start point 60B. The controller 20 will therefore select the swath path with associated swath path start point 60A as the desired swath path to be followed by the automatic guidance control system 16 and will begin automatic guidance toward the swath path start point 60A to follow the associated swath path. If the user wishes to suspend the automatic guidance, the user can, for example, select an option shown on the display 32 or turn the steering wheel to automatically suspend the automatic guidance. The user can then manually drive the vehicle 10 until the automatic guidance is engaged again, at which point the controller 20 will determine on which swath path the user desires to begin.

Figure 4:
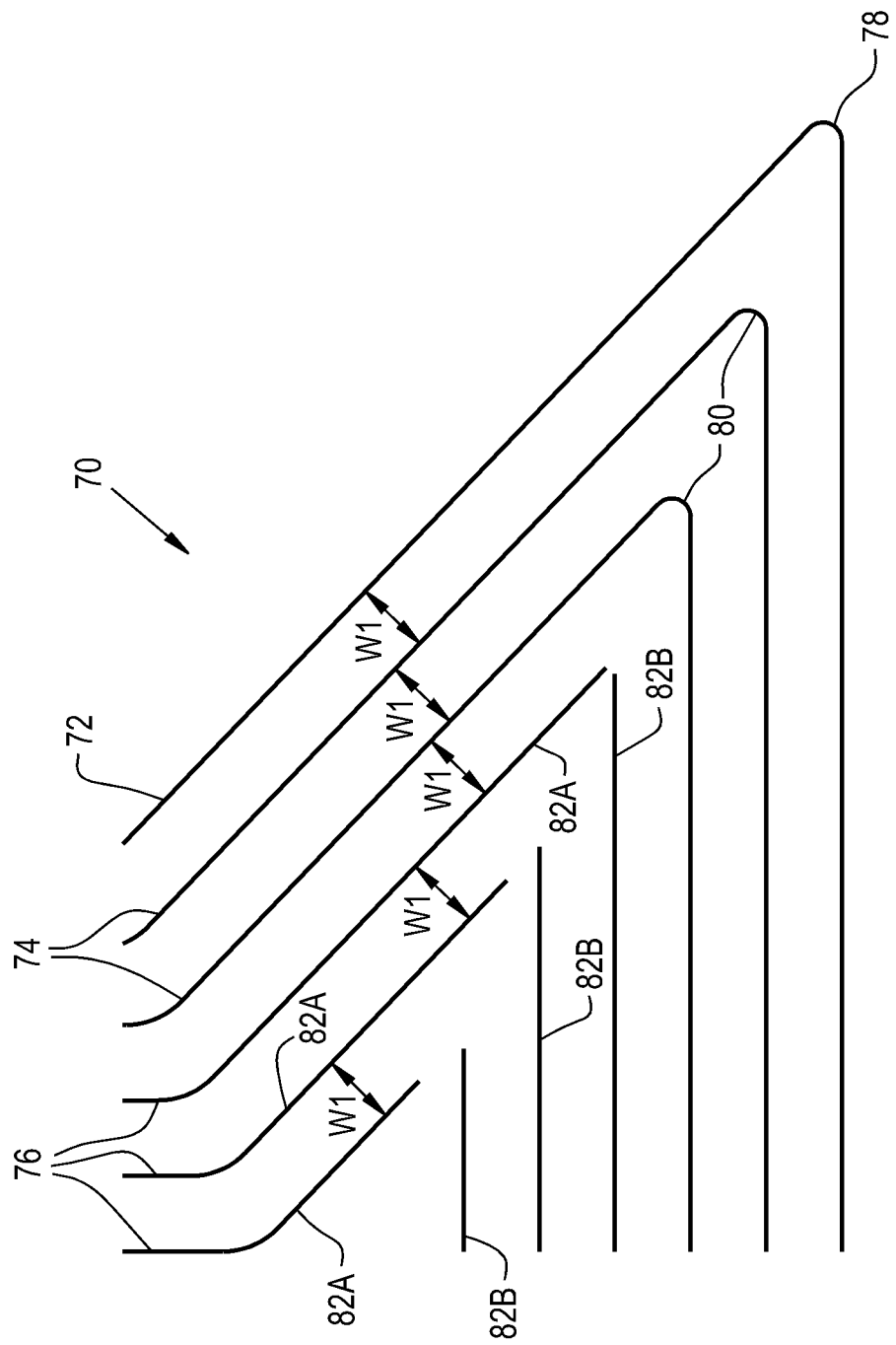
FIG. 4 is a top view of a portion of another field with a swath pattern generated from field boundary lines according to the present invention.

Referring now to FIG. 4, a portion of another field with a swath pattern 70 generated by the controller 20 is shown. The shown swath pattern 70 includes a field boundary 72, two headland passes 74 interior and parallel to the field boundary 72, and three infill swath paths 76 interior and parallel to the headland passes 74. The field boundary 72, headland passes 74, and infill swath paths 76 are all separated by a swath width W1 that can be chosen prior to generating the swath pattern 70. As can be seen, the field boundary 72 has a rounded corner 78 and the headland passes 74 have relatively rounded corners 80. However, the infill swath paths 76, which are interior of the headland passes 74, have increasingly sharp corners due to maintaining the swath width W1 between adjacent swath paths. Since the vehicle 10 and pulled implement 22 have a maximum minimum turning radius that the vehicle 10 can safely maneuver, the sharp corners of the infill swath paths 76 pose a problem to the vehicle 10 safely maneuvering since the corners are sharper than the maximum minimum turning radius. To allow the vehicle 10 to safely maneuver these corners, the controller 20 can determine that these corners are too sharp for the vehicle 10 to safely maneuver and truncate the infill swath paths 76 into two swath path segments 82A and 82B, as shown. Each swath path segment 82A, 82B can therefore define its own separate swath path that the controller 20 can analyze to determine the optimal vehicle travel path across the swath pattern 70.

Figure 5:
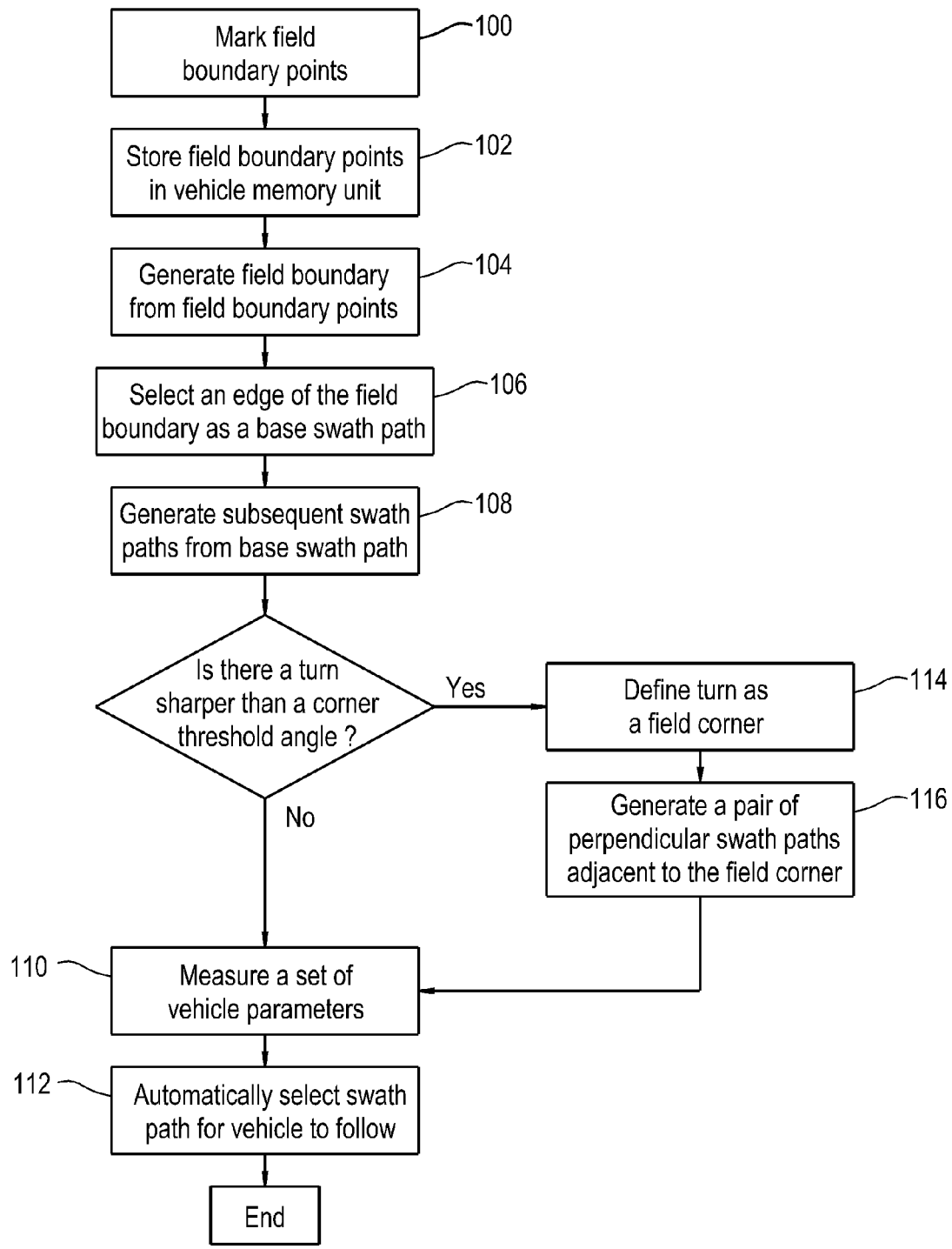
FIG. 5 is a flow chart of an embodiment of a method according to the present invention.

Referring now specifically to FIG. 5, and also referencing elements shown in FIGS. 1-3, an embodiment of a method according to the present invention is shown as a flow chart. The field boundary points 24 are marked 100 using a vehicle equipped with a location sensor and/or farm management software and stored 102 in the memory unit 18 of the vehicle 10. The field boundary 36 is then generated 104, by the controller 20 or otherwise, by connecting the field boundary points 24 to one another as previously described. An edge of the field boundary 36, such as baseline edge 50, is selected 106 as a base swath path which is used as a basis for generating 108 headland passes 38 and infill swath paths 48. After the swath paths 38, 48 are generated, a set of parameters of the vehicle 10, such as vehicle speed, current heading, and current location, is measured 110 as the vehicle 10 travels and the controller 20 automatically selects 112 one of the swath paths 48 for the vehicle 10 to follow based on the set of parameters, as previously described. Further, the controller 20 can define 114 at least one field corner 44 in the field boundary 36 that has a turn sharper than a corner threshold angle, if one exists, and generate 116 a pair of swath paths 46A, 46B that are perpendicular to one another adjacent to the field corner 44.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for automatically generating swath paths used for navigating a vehicle along the generated swath paths using a controller, the method comprising the steps of:
    storing field boundary points in a memory unit of said vehicle in communication with said controller, the field boundary points corresponding to global positioning system (GPS) or other geographic location points of a boundary of a field;
    generating a field boundary defined by adjacent field boundary points connected to one another;
    selecting an edge of said field boundary as a base swath path;
    generating a plurality of subsequent swath paths from said base swath path, wherein each subsequent swath path is defined by a plurality of segments, and wherein generating the segments of each of the plurality of subsequent swath paths comprises:
    using the boundary points of the base swath path to generate a subsequent swath path that is parallel to the boundary and is a predetermined distance from the base swath path;
    determining that at least one curved portion of the subsequent swath path has a curvature that is greater than that of a minimum turning radius of the vehicle;
    for each curved portion of the subsequent swath path having a curvature that is greater than that of the minimum turning radius of the vehicle, dividing the curved portion into at least two curved portions that each have a curvature that is less than or equal to that of the minimum turning radius of the vehicle,
    wherein a distance between each adjacent subsequent swath path is approximately the same;
    measuring a set of parameters of said vehicle as the vehicle travels; and
    automatically selecting one of said subsequent swath paths for said vehicle to follow based on said set of parameters.

2. The method according to claim 1, further comprising the step of defining a start point and a stop point for each of said plurality of subsequent swath paths, wherein said set of parameters defines at least a current geographic location of said vehicle.

3. The method according to claim 2, wherein said selected subsequent swath path has a start point closest to said current geographic location of said vehicle.

4. The method according to claim 2, wherein said set of parameters further defines a current heading of said vehicle, said selected subsequent swath path having a start point within 90 degrees of said current heading of said vehicle.

5. The method according to claim 1, further comprising the steps of defining at least one field corner in said field boundary.

6. The method according to claim 5, wherein said at least one field corner is defined as a pair of connected swath paths defining a turn that is sharper than a minimum turning radius of said vehicle.

7. An agricultural vehicle, comprising:
    a chassis;
    at least one traction member carried by said chassis;
    an automatic guidance control system carried by said chassis and operable to control a direction of said at least one traction member;
    a memory unit having a plurality of field boundary points programmed therein, the field boundary points corresponding to global positioning system (GPS) or other geographic location points of a boundary of a field; and
    a controller linked to said automatic guidance control system and said memory unit, said controller being operable to:
    generate a field boundary defined by adjacent field boundary points connected to one another;
    select an edge of said field boundary as a base swath path;
    generate a plurality of subsequent swath paths from said base swath path, wherein each subsequent swath path is defined by a plurality of segments, and wherein generating the segments of each subsequent swath path comprises:
    generating a plurality of points, each located a predetermined width away from the boundary;
    for each generated point, identifying two closest other points;
    determine whether the point and the two closest points define a line within a predetermined variance of a straight line;
    responsive to a determination that the point and the two closest points defined a line within the predetermined variance of a straight line, defining the line connecting the point and the two closest points as a straight line segment of the subsequent swath path;
    responsive to a determination that the point and the two closest points do not define a line within the predetermined variance of a straight line, determine whether a curvature of an arc connecting the point with the two closest points is less than that of a minimum turning radius of the vehicle;
    responsive to a determination that the curvature of the arc connecting the point with the two closest points is less than that of the minimum turning radius of the vehicle, defining the arc as a curved swath segment of the subsequent swath path; and
    responsive to a determination that the curvature of the arc connecting the point with the two closest points is not less than that of the minimum turning radius of the vehicle, divide the arc into two or more segments of the subsequent swath path that each have a curvature less than that of the minimum turning radius of the vehicle;
    measure a set of parameters of said vehicle;
    automatically select one of said subsequent swath paths based on said set of parameters; and cause said automatic guidance control system to direct said at least one traction member such that said vehicle follows said selected subsequent swath path.

8. The agricultural vehicle according to claim 7, wherein said controller is further operable to define a start point and a stop point for each of said plurality of subsequent swath paths.

9. The agricultural vehicle according to claim 8, further comprising a location sensor coupled to said controller, wherein at least one of said measured parameters is a current geographic location of said vehicle.

10. The agricultural vehicle according to claim 9, wherein said selected subsequent swath path has a start point closest to said current geographic location of said vehicle.

11. The agricultural vehicle according to claim 9, wherein at least one of said parameters is a current heading of said vehicle and said selected subsequent swath path has a start point within 90 degrees of said current heading of said vehicle.

12. The agricultural vehicle according to claim 7, wherein said controller is operable to define at least one headland area and at least one field corner in said field boundary.

* * * * *